W. COOPER.

Chain-Pump.

No. 6,700. Reissued Oct. 19, 1875.

WITNESSES

Franck L. Durand

C. M. Bart

By

INVENTOR

William Cooper per Alexander Stuart

Attorney S

N. PETERS, PHOTO-LITHOGRAPHER, WASHINGTON, D. C.

UNITED STATES PATENT OFFICE.

WILLIAM COOPER, OF YPSILANTI, MICHIGAN.

IMPROVEMENT IN CHAIN-PUMPS.

Specification forming part of Letters Patent No. 127,576, dated June 4, 1872; reissue No. 6,700, dated October 19, 1875; application filed August 14, 1875.

*To all whom it may concern:*

Be it known that I, WILLIAM COOPER, of Ypsilanti, in the county of Washtenaw and State of Michigan, have invented certain new and useful Improvements in Chain-Pumps; and I do hereby declare that the following is a full, clear, and exact description thereof, reference being had to the accompanying drawings, and to the letters of reference marked thereon, which form a part of this specification.

The nature of my invention consists in the construction and arrangement of a bucket for chain-pumps, as will be hereinafter more fully set forth.

In order to enable others skilled in the art to which my invention appertains to make and use the same, I will now proceed to describe its construction and operation, referring to the annexed drawing, in which—

Figure 1:
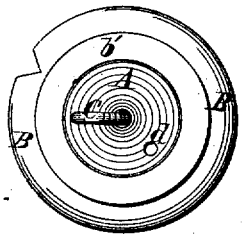
Figure 2:
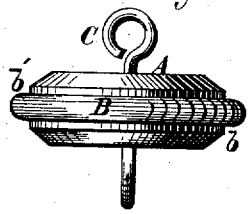
Figure 3:
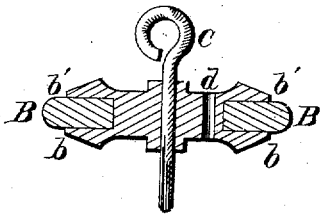
Figure 4:
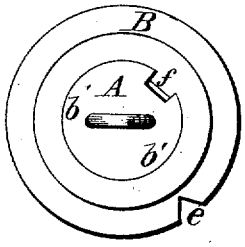
Figure 5:
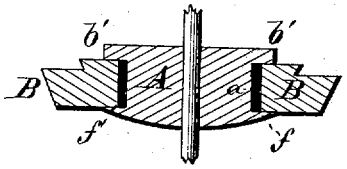

Figure 1 is a plan view, Fig. 2 a side view, and Fig. 3 a longitudinal section, of my chain-pump bucket. Fig. 4 is a plan view, and Fig. 5 a longitudinal vertical section, of the same, showing the means for expanding the bucket when reduced by wear.

A represents a head or disk, made of any suitable material and of any dimensions desired, and provided with a circumferential groove, *a*. This head or wheel is, at its lower edge, provided with a circumferential flange, *b*, forming a shoulder upon which the rubber collar B rests. The rubber collar B is made of any suitable thickness and sprung around the head A on top of the flange *b*, which prevents the rubber slipping off while the bucket is moving upward. At the upper edge of the head A is a projecting flange, *b'*, to prevent the rubber from slipping off when the chain falls or slips. Through the center of the head A is passed a wire, C, forming hooks or eyes at each end to connect with the adjoining buckets on both sides. In the edge of the rubber collar B is made a notch, *e*, which allows the water to pass through and prevents freezing. Ordinarily a vent is made through the bucket, in the form as shown at *d;* but this is liable to become clogged, and also allows some water to stand at the edges of the bucket and freeze in cold weather. This is entirely obviated by forming the notch *e* in the edge of the rubber, and this notch is easily cleared if it should become clogged.

When the rubber B wears so that it does not fill the tube, it can be removed and a piece, *f*, of leather or other material inserted to increase the size of the rubber, and thus fill the tube as good as new.

I am aware that a chain-pump bucket provided with a perforation which extends through the body of the elastic material is not new; but in such case the water will be around the edges of the bucket, and be liable to freeze, hence cannot accomplish the result designed by me.

My invention is to prevent the water from freezing around the edge of the bucket, and to this end the drip-notch is cut through the edge of the bucket.

Having thus fully described my invention, what I claim as new, and desire to secure by Letters Patent, is—

1. In a chain-pump bucket, the rubber collar B, provided with a notch, *e*, in the edge, for the purposes herein set forth.

2. The head A, having groove *a*, flanges *b* *b'*, and wire C, and provided between the flanges with the rubber collar B, having notch *e*, substantially as herein set forth.

3. In combination with the head A and rubber B, the leather or other material *f* inserted between the rubber and head, substantially as and for the purposes herein set forth.

In testimony that I claim the foregoing I have hereunto set my hand this 11th day of August, 1875.

WM. COOPER.

Witnesses:
J. M. MASON,
C. L. EVERT.